March 24, 1970   A. F. GILES   3,501,951
FORCE MEASURING INSTRUMENTS
Filed June 6, 1967   2 Sheets-Sheet 1
United States Patent Office 3,501,951
Patented Mar. 24, 1970

---

3,501,951
FORCE MEASURING INSTRUMENTS
Alan Frederick Giles, Wembley, England, assignor to Unilever Limited, Port Sunlight, England, a company of Great Britain
Filed June 6, 1967, Ser. No. 643,958
Claims priority, application Great Britain, June 9, 1966, 25,719/66
Int. Cl. G01l 1/22
U.S. Cl. 73—141                                    3 Claims

---

ABSTRACT OF THE DISCLOSURE

A force transducer particularly suitable for use as a check weigher in which the use of pivots and complex linkages which might give rise to error are eliminated by use of a direct flexible coupling.

---

Figure 1:
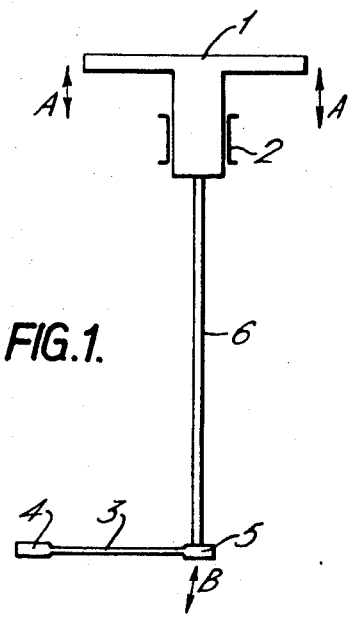

The present invention relates to measuring instruments and more particularly to force transducers, for example weigh heads to which a force may be applied to produce an output reading whose magnitude is dependent on the magnitude of force loading.

According to the invention a force transducer, for example a weigh head, is provided comprising a sensing member to which a force to be measured may be applied and which is constrained to move back and forth in a single direction; a gauging bar located transverse to the direction of movement of said sensing member, having one end fixed and the other end coupled to the sensing member so that movement of the sensing member bends the bar, and comprising strain gauging means for gauging the bending strain thereby produced in the bar; and a flexible coupling rod located substantially parallel to the direction of movement of the sensing member, rigidly connected at one end to the bar and rigidly connected at the other to the sensing member and being sufficiently flexible for rectilinear movement of the sensing member to be converted to curvilinear movement of the end of the bar without introducing unwanted stresses or friction.

By use of a flexible coupling rod rigidly connected to the bar and to the sensing member the angular change and transverse movement of the end of the bar which inevitably occurs during its bending is taken up by flexure of the coupling rod and this avoids the need for complex linkages and pivots which would otherwise be required and which would introduce errors into the system. To achieve this the flexibility of the rod should be considerably more than that of the gauging bar so as to avoid unwanted distortion of the gauging bar, but the rod should be sufficiently rigid to transmit the required movement to the bar.

The sensing member may comprise a tube extending in the aforesaid direction of movement and located in position by at least two flexible diaphragms which constrain movement to the single direction. Conveniently, to provide a compact form of construction, the flexible rod may be located within a hollow portion of said tube.

In a preferred form the force transducer comprises a housing within which the flexible rod and gauging means may be hermetically sealed. A form of sealing which may be used in such a sealed force transducer comprises an annular resilient sealing disc, the inner edge of which is sealed by a flexible washer, for example an O ring, to the movable sensing member, and the outer edge of which is sealed by a flexible washer, for example an O ring, to a stationary part of the force transducer housing. The annular sealing disc should be under tension at all positions of the sensing member in order to avoid sudden changes of stress during movement of the sensing member, and this may be achieved by the action of gripping and tensioning as component parts of the force transducer are tightened during assembly.

Figure 2:
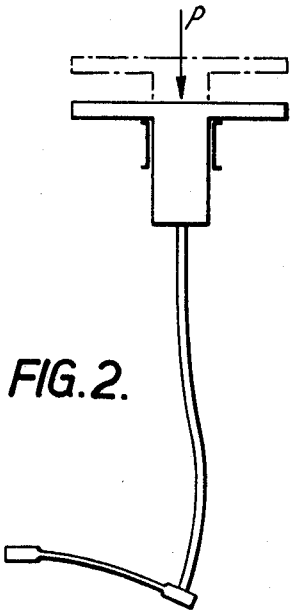
Figure 3:
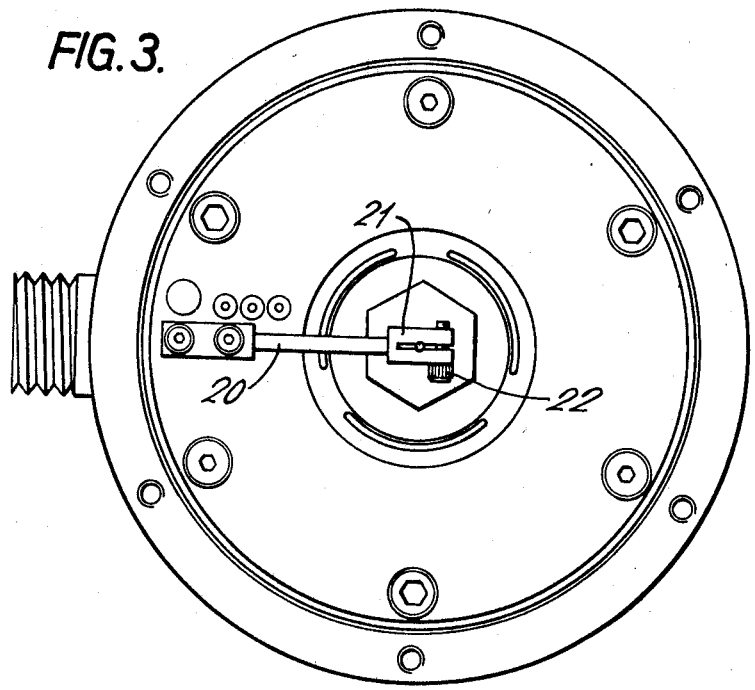

An embodiment of the invention will now be described by way of example with reference to the accompanying diagrammatic drawings in which:

FIGURES 1 and 2 are diagrams showing the principle of operation of the invention;
FIGURE 3 is an underside plan of a weigh head; and
FIGURE 4 is a sectioned side elevation of the weigh head.

FIGURE 1 shows in diagrammatic form a weigh platform 1 which is constrained by guides 2 to move in a rectilinear direction AA (N.B. guides are not necessarily the best form of constraint but conveniently illustrate the principle). Movement of the platform 1 is measured by a gauging bar 3, one end 4 of which is fixed and the other end 5 is coupled to the weigh platform.

From FIGURE 1 it can be seen that the rectilinear movement of the weigh platform 1 as indicated by arrow AA has to be converted to curvilinear movement as indicated by arrow B at the end 5 of the gauging bar 3. This conversion of rectilinear to curvilinear movement is carried out in accordance with the present invention by means of a flexible coupling rod 6 which is rigidly connected at one end to the weigh platform 1 and at the other end to the end 5 of the gauging bar 3. Referring to FIGURE 2 it can be seen that application of a force P to the weigh platform produces a rectilinear movement of the platform 1 which is transmitted as curvilinear movement to the end 5 of the gauging bar 3 producing simple bending with negligible distortion of the bar 3, the change in direction of movement being taken up by flexure of the rod 6 as shown (illustration of these movements being exaggerated to show the principle).

Figure 4:
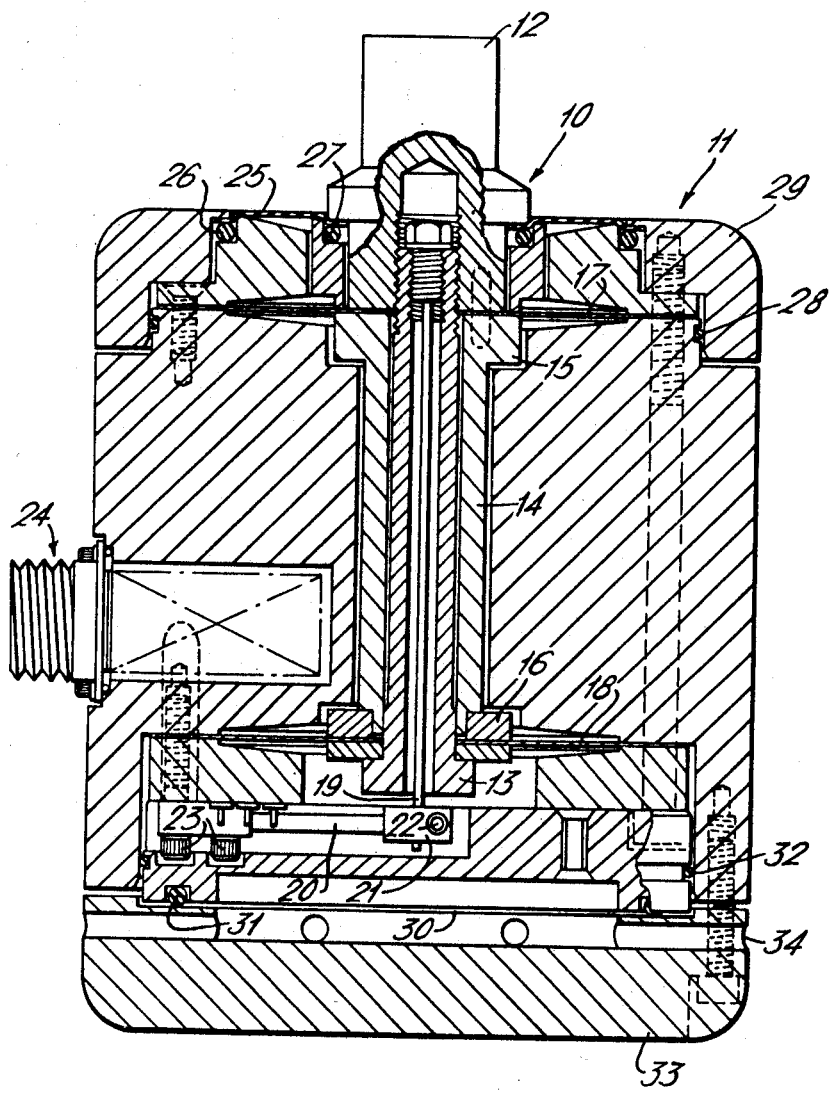

Referring to FIGURES 3 and 4 a practical embodiment of a weigh head in accordance with the invention is shown. A movable sensing member 10 is resiliently supported within a stationary body portion 11 which is constructed mainly from machined aluminium alloy. The sensing member 10 comprises an upstanding boss 12 to which a weigh platform may be attached and into which a tube 13 is screwed. The tube 13 is located within a sleeve 14 which has abutments 15 and 16 to act as limit stops to control the limit of movement of the tube 13. The tube and sleeve are supported by Phosphor bronze diaphragms 17 and 18 which allow the assembly to move resiliently up and down but only along the axis of the weigh head. These diaphragms are clamped at their inner edges to the tube and sleeve assembly and at their outer edges to the body 11.

Within the tube 13 a flexible coupling rod 19 is carried, being brazed into a fixing screw at its upper end which is screwed into the tube 13 and being clamped at its lower end to a gauging bar 20. The tube 13 is hollow to take the coupling rod 19 and there is sufficient space to enable the rod 19 to flex without touching the tube walls.

The gauging bar 20 is attached to the coupling rod 19 by means of a split clamp 21 at one of its ends, which can be tightened by a screw 22. At its other end the bar 20 is firmly attached by screws 23 to the body portion 11. The bar carries a pair of resistance strain gauges attached to its upper and lower faces respectively so that when the bar is bent one will increase in resistance while the other decreases. The electrical connections from these strain gauges are fed out via a hermetically sealed plug receptacle 24, a cavity behind the receptacle enabling any necessary bridge and compensating resistors to be accommodated.

The operative parts of the sensing member are hermetically sealed within the body portion 11 by means of flexible discs and O rings. At the upper end, an annular synthetic rubber disc 25 seals the moving sensing member 10 to the stationary body portion 11 with the aid of O rings 26 and 27 at its outer and inner edges respectively. During assembly the various component parts are tightened so as to tension the disc in the manner shown, thus providing a good seal and tensioning the disc so that sudden changes of stress cannot occur when the sensing member moves. A further O ring 28 seals the upper end cap 29.

At the lower end a synthetic rubber disc 30 effects a seal with the aid of an O ring 31 while a further O ring 32 completes the seal. A bottom cap 33 (not shown in FIGURE 3) covers the disc 30 and is vented to atmosphere via channels 34.

In operation a load applied to the boss 12 causes vertical movement of the sensing member 10 which is transmitted as a bending stress to the gauging bar 20 by the flexible coupling rod which flexes in the manner shown in FIGURE 2 while transmitting this movement.

In a practical example of this embodiment the gauging bar was 2.5 cm. in length and had a flexibility such that one kg. produced 0.1 mm. deflection at the end of the bar. The coupling rod was 9.5 cm. in length and considerably more flexible, a deflection of .3 mm. at one end being produced by 8 gm. loading.

What is claimed is:

1. A force transducer comprising a movable sensing member, constraining means for allowing rectilinear movement of said sensing member in response to a change in magnitude of a load applied thereto, and for limiting the direction of movement of said load sensing member to substantially that of said applied load, an elongated tube having one end fixed to said load sensing member and the other end terminating in space to allow rectilinear movement of said tube, a flexible gauging bar located transverse to the direction of movement of said load sensing member, a flexible coupling rod disposed longitudinally within said tube to provide a compact form of construction, the clearance between said tube and said rod being sufficient to enable said rod to flex without touching the walls of said tube, said rod connecting said sensing member with one end of said gauging bar, the other end of said gauging bar being rigidly fixed, said coupling rod being sufficiently flexible to convert rectilinear movement of said sensing member to curvilinear movement of said gauging bar without introducing unwanted stresses.

2. A force transducer according to claim 1 in which the said constraining means comprises a pair of spaced-apart resilient diaphragms.

3. A force transducer comprising a movable tubular sensing member, at least two resilient members being attached to said sensing member in spaced-apart relationship whereby when a load is applied to the sensing member said members will limit the direction of movement of said sensing member to substantially that of said applied load and return said sensing member to its normal position when said load is removed, a flexible gauging bar located transverse to the direction of movement of said sensing member, a flexible coupling rod disposed longitudinally within said sensing member and having one of its ends connected to said sensing member and its other end coupled to one end of said flexible gauging bar, the other end of said flexible gauging bar being fixed, said coupling rod being sufficiently flexible to convert rectilinear movement of said sensing member to curvilinear movement of said gauging bar without introducing unwanted stresses.

References Cited

UNITED STATES PATENTS

| 2,472,047 | 5/1949 | Ruge | 73—141 |
| 2,772,569 | 12/1956 | Ruge | 73—398 |
| 3,161,046 | 12/1964 | Farley | 73—141 |
| 3,320,569 | 5/1967 | Jones | 73—141 XR |
| 3,341,796 | 9/1967 | Eisele | 73—141 XR |
| 3,411,361 | 11/1968 | McLellan | 73—141 XR |

CHARLES A. RUEHL, Primary Examiner

U.S. Cl. X.R.

177—211.